(12) United States Patent
Soo et al.

(10) Patent No.: US 9,596,496 B2
(45) Date of Patent: *Mar. 14, 2017

(54) SYSTEM AND METHOD TO DELIVER VIDEO CONTENT

(71) Applicant: AT&T INTELLECTUAL PROPERTY I, LP, Atlanta, GA (US)

(72) Inventors: Armstrong Soo, San Ramon, CA (US); Bernard Ku, Austin, TX (US); Zhi Li, San Ramon, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,248

(22) Filed: Apr. 26, 2016

(65) Prior Publication Data

US 2016/0241897 A1 Aug. 18, 2016

Related U.S. Application Data

(63) Continuation of application No. 14/680,205, filed on Apr. 7, 2015, now Pat. No. 9,351,026, which is a (Continued)

(51) Int. Cl.
*H04N 7/173* (2011.01)
*H04N 21/262* (2011.01)
(Continued)

(52) U.S. Cl.
CPC ..... *H04N 21/26208* (2013.01); *H04N 7/1675* (2013.01); *H04N 7/17318* (2013.01);
(Continued)

(58) Field of Classification Search
CPC ........... H04N 21/26208; H04N 7/1675; H04N 7/17318; H04N 21/2393; H04N 21/25816;
(Continued)

(56) References Cited

U.S. PATENT DOCUMENTS 5,317,391 A 5/1994 Banker
5,857,020 A 1/1999 Peterson, Jr.
(Continued)

OTHER PUBLICATIONS

OMA Open Mobile Alliance, Service Guide for Mobile Broadcast Services, Draft Version 1.0, Mar. 24, 2006, pp. 1-168.*

*Primary Examiner* — Nathan Flynn
*Assistant Examiner* — Alfonso Castro
(74) *Attorney, Agent, or Firm* — Guntin & Gust, PLC; Atanu Das

(57) ABSTRACT

Aspects of the subject disclosure may include, for example, identifying video content having a scheduled broadcast time during a first viewing period that satisfies a viewership threshold and facilitating a transfer of the video content to a multimedia storage device. The video content is transferred to the multimedia storage device during a second viewing period prior to the first viewing period. The video content includes the data to prevent the multimedia storage device from sending the video content to another device prior to the time when the program is scheduled to be broadcast. Other embodiments are disclosed.

20 Claims, 8 Drawing Sheets

Related U.S. Application Data continuation of application No. 13/848,130, filed on Mar. 21, 2013, now Pat. No. 9,027,066, which is a continuation of application No. 12/332,485, filed on Dec. 11, 2008, now Pat. No. 8,429,701.

(51) Int. Cl.
| | | |
|---|---|---|
| *H04N 7/167* | (2011.01) | |
| *H04N 21/433* | (2011.01) | |
| *H04N 21/6543* | (2011.01) | |
| *H04N 21/472* | (2011.01) | |
| *H04N 21/239* | (2011.01) | |
| *H04N 21/258* | (2011.01) | |
| *H04N 21/266* | (2011.01) | |
| *H04N 21/4147* | (2011.01) | |

(52) U.S. Cl.
CPC ... *H04N 21/2393* (2013.01); *H04N 21/25816* (2013.01); *H04N 21/266* (2013.01); *H04N 21/26216* (2013.01); *H04N 21/4147* (2013.01); *H04N 21/4331* (2013.01); *H04N 21/4334* (2013.01); *H04N 21/47202* (2013.01); *H04N 21/6543* (2013.01)

(58) Field of Classification Search
CPC .......... H04N 21/26216; H04N 21/266; H04N 21/4147; H04N 21/4331; H04N 21/4334; H04N 21/47202; H04N 21/6543
USPC ........................................................ 725/87
See application file for complete search history.

(56) References Cited

U.S. PATENT DOCUMENTS

| | | |
|---|---|---|
| 6,324,182 B1 | 11/2001 | Burns |
| 7,721,337 B2 | 5/2010 | Syed |
| 9,351,026 B2 * | 5/2016 | Soo ..................... H04N 7/1675 |
| 2002/0026645 A1 | 2/2002 | Son |
| 2002/0081090 A1 | 6/2002 | Agnihotri |
| 2005/0097624 A1 | 5/2005 | Salo |
| 2006/0215988 A1 | 9/2006 | Tol |
| 2007/0011747 A1 | 1/2007 | Whitfield |
| 2007/0162502 A1 | 7/2007 | Thomas |
| 2007/0256112 A1 | 11/2007 | Weaver |
| 2007/0294717 A1 | 12/2007 | Hill |
| 2008/0101460 A1 | 5/2008 | Rodriguez |
| 2008/0134039 A1 | 6/2008 | Fischer |
| 2009/0055880 A1 | 2/2009 | Batteram |
| 2009/0113496 A1 | 4/2009 | Kummer |
| 2016/0241897 A1 | 8/2016 | Soo |

\* cited by examiner

SYSTEM AND METHOD TO DELIVER VIDEO CONTENT

CROSS-REFERENCE TO RELATED APPLICATIONS

This application is a Continuation of and claims priority to U.S. patent application Ser. No. 14/680,205 filed Apr. 7, 2015, which is a Continuation of and claims priority to U.S. patent application Ser. No. 13/848,130, filed Mar. 21, 2013, which is a Continuation of and claims priority to U.S. patent application Ser. No. 12/332,485, filed Dec. 11, 2008. The contents of each of the foregoing is/are hereby incorporated by reference into this application as if set forth herein in full.

FIELD OF THE DISCLOSURE

The present disclosure generally relates to communications networks, and more particularly relates to delivering video content.

BACKGROUND

Television service providers are able to deliver a wide variety of television content. Many viewers may simultaneously view a television program, such as a season premiere or finale of a television series. Other viewers may wish to record the television program for viewing at another time.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
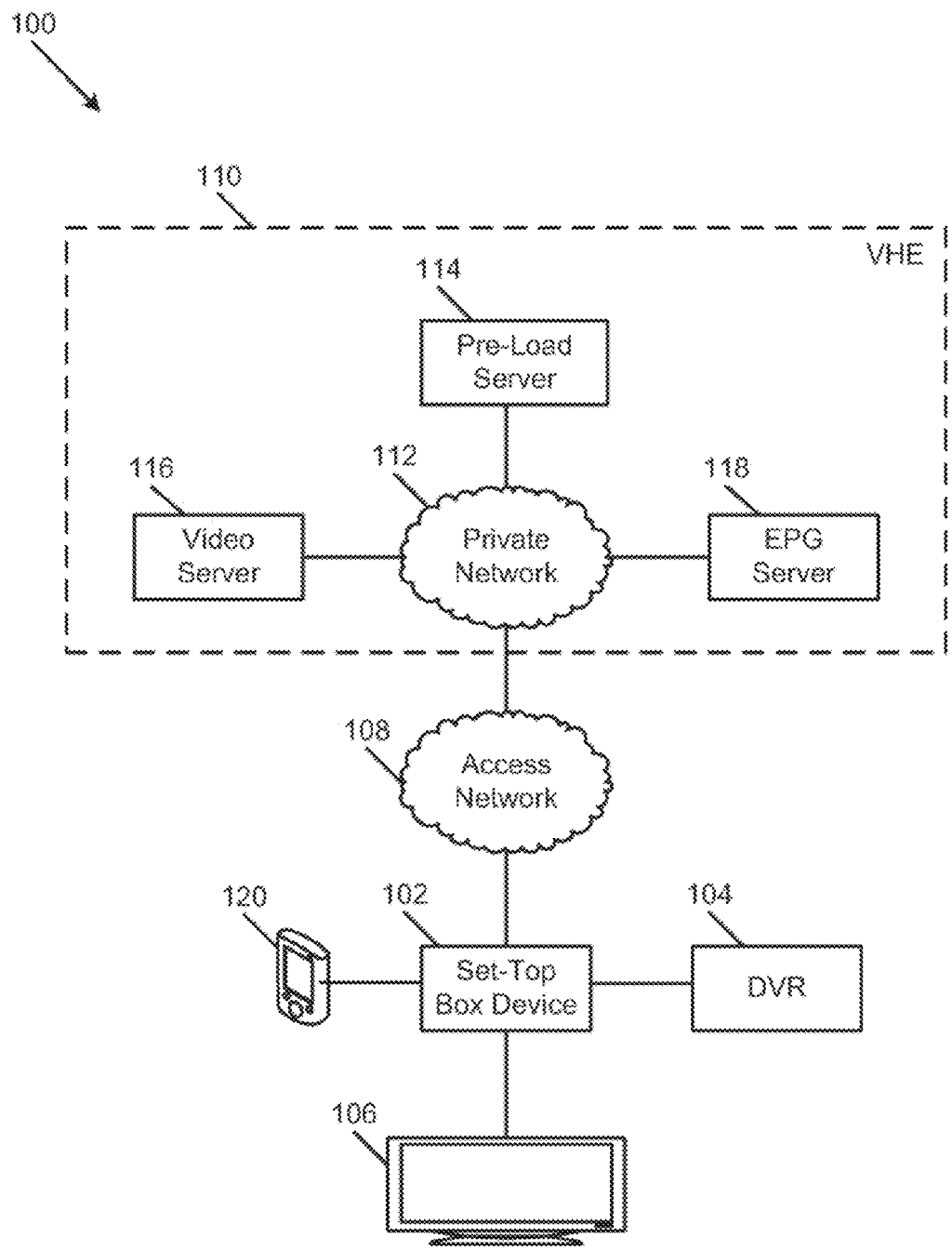
FIG. 1 is a block diagram illustrating a particular embodiment of a system to deliver video content.

FIG. 1 illustrates a particular embodiment of a system 100 to deliver video content. The system 100 includes a set-top box device 102 coupled to a multimedia storage device, such as a digital video recorder (DVR) 104. In one embodiment, the set-top box device 102 can be coupled to another multimedia storage device, such as a portable media player 120 (for example, a handheld computing device, portable MPEG player, other portable video content player, or any combination thereof) coupled to a universal serial bus (USB) connection or other connection at the set-top box device 102. The set-top box device 102 is also coupled to a display device, such as a television 106.

The set-top box device 102 communicates with a video head-end (VHE) 110 of a video service provider via an access network 108, such as an Internet Protocol Television access network. In one embodiment, the access network 108 can communicate with a private network 112 at the VHE 110. A pre-load server 114, a video server 116 and an electronic program guide (EPG) server 118 each communicate with the private network 112.

In another embodiment, the DVR 104 can be integrated with the set-top box device 102. In yet another embodiment, the DVR 104 can separately communicate with the television 106, the access network 108, or a combination thereof, such as without the set-top box device 102 as an intermediary.

In an illustrative embodiment, the pre-load server 114 is adapted to identify a television program that is scheduled to be broadcast at a time that is during a peak viewing period. The peak viewing period can be determined by the time, such as a time during a prime time viewing period; by the television program, such as a series finale of a series; or a combination thereof. In one example, the pre-load server 114 can be adapted to obtain data related to television programs from the EPG server 118, or from another source at the VHE 110, and to identify the television program based on the data obtained from the EPG server 118 or other source.

In addition, the pre-load server 114 is adapted to identify a recipient multimedia storage device that is to receive video content associated with the identified television program, such as the set-top box device 102, the DVR 104, the portable media player 120, or any combination thereof. In one embodiment, the pre-load server 114 can be adapted to determine that the recipient multimedia storage device is scheduled to record the television program. For example, the pre-load server 114 can be adapted to store data received from the DVR 104 indicating that the DVR 104 has received a command to record the television program.

In another embodiment, the pre-load server 114 can be adapted to intelligently identify the recipient multimedia storage device by identifying a corresponding multimedia receiver, such as the set-top box device 102 or the portable media player 120, which is likely to request the television program. In one example, the pre-load server 114 can be adapted to request from a historical data server (not shown) data indicating multimedia receivers that received previous episodes associated with the television program, data indicating multimedia receivers that previously received a related television program, data indicating multimedia receivers that previously received a television program having a same actor, other data suitable to predict whether a multimedia receiver is likely to request video content associated with the television program, or any combination thereof. The pre-load server 114 can identify the DVR 104, for example, by determining that the set-top box device 102, the portable media player 120, or a combination thereof, has requested a previous episode of the identified television program.

In another example, the recipient multimedia storage device can be identified based on historical data associated with the recipient multimedia storage device, with a customer related to the recipient multimedia storage device, with a multimedia receiver related to the recipient multimedia storage device, or any combination thereof. For instance, the historical data can indicate that video content associated with a previous episode of the television program was sent to the multimedia storage device, to a multimedia receiver associated with the multimedia storage device, or a combination thereof. Alternatively, the historical data indicates that video content associated with a related television program was sent to the multimedia storage device, to a multimedia receiver associated with the multimedia storage device, or a combination thereof.

The pre-load server 114 is adapted to instruct the video server 116 to send video content associated with the identified television program to the recipient multimedia storage device during a non-peak period that precedes the peak viewing period during which the television program is scheduled to be broadcast. The video content includes data to prevent viewing of the video content prior to the time at which the television program is scheduled to be broadcast. In one embodiment, the pre-load server 114 is adapted to generate the data. For instance, the pre-load server 114 can be adapted to generate digital rights management (DRM) data that includes data indicating the time at which the television program is scheduled to be broadcast. In another example, the pre-load server 114 can be adapted to add data indicating the time to pre-existing DRM data associated with the television program. In another embodiment, the pre-load server 114 can be adapted to obtain the data to prevent viewing of the video content prior to the time at which the television program is scheduled to be broadcast from another source. In still another embodiment, the data can be included with video content sent by a video content provider or an acquisition source (not shown) at the VHE 110 to the video server 116.

In another illustrative embodiment, the pre-load server 114 can be adapted to identify a plurality of television programs, where each television program is scheduled to be broadcast at a time that is during one of a plurality of peak viewing periods. For example, the pre-load server can request data from a video acquisition server at the beginning of a calendar week (or another period, such as a day or month) indicating television programs that are scheduled to be broadcast during peak viewing periods, such as television programs that are scheduled to be broadcast during daily prime time hours and television programs that are likely to cause peak viewership (such as premieres, finales, television programs scheduled to be broadcast opposite major sporting events or other live events).

The pre-load server 114 can be adapted to identify a recipient multimedia storage device that is to receive each of the plurality of identified television programs. The pre-load server 114 can be adapted to identify, for example, a plurality of DVRs, other multimedia storage devices, or any combination thereof, where each such device is scheduled to record an identified television program. Additionally, the pre-load server 114 can be adapted to intelligently identify a plurality of DVRs, other multimedia storage devices, or any combination thereof, where each such device is associated with a multimedia receiver that is likely to request an identified television program.

In a particular embodiment, the pre-load server 114 can be adapted to obtain or generate data to prevent viewing of video content related to each of the plurality of identified television programs. The pre-load server 114 can be adapted to send the data to prevent premature viewing of video content associated with each television program to the video server 116 and to instruct the video server 116 to send video content associated with each identified television programs to a multimedia storage device that is to receive that television program, during a non-peak period that precedes the earliest peak viewing period during which any of the plurality of television programs is scheduled to be broadcast. Thus, in an example embodiment, video content for all of the plurality of identified television programs can be pre-loaded at corresponding recipient multimedia storage devices at the beginning of the calendar week or other period, before the first peak viewing period (such as Sunday prime time) occurs.

In a particular embodiment, the DVR 104 can be adapted to determine whether a television program is scheduled to be broadcast at a time that is during a peak viewing period, in response to receiving a command to record the program. If so, the DVR 104 can send data to the pre-load server 114 indicating that the DVR 104 is scheduled to record the television program. The DVR 104 is adapted to store video content associated with the television program, which is received from the video server 116 during a non-peak period that precedes the peak viewing period.

In addition, the DVR 104 can be adapted to receive a request for the video content associated with the television program from the set-top box device 102, from a user (such as via a remote control device associated with the DVR 104), from the television 106, from the portable media player 120, or any combination thereof. The DVR 104 is adapted to determine, based on data received with the video content, whether the request is substantially concurrent with or after a time at which the television program is scheduled to be broadcast. If so, the DVR 104 is adapted to cause the video content to be sent to the television 106 or other requesting device. For example, the DVR 104 can send the video content to the television 106 or the portable media player 120; or, the DVR 104 can send the video content to the set-top box device 102, and the set-top box device 102 can send the video content to the television 106 or the portable media player 120.

If the request is not substantially concurrent with or after a time at which the television program is scheduled to be broadcast, the DVR 104 is adapted to not cause the video content to be sent to the television 106 or other requesting device. For example, the DVR 104 can send a denial of access indicator to the requesting device.

In another particular embodiment, the set-top box device 102 is adapted to receive a request from a user to view a television program or from the portable media player 120 to download the television program. The set-top box device 102 is adapted to determine whether the request is substantially concurrent with or after a time at which the television program is scheduled to be broadcast. For instance, the set-top box device 102 can inspect EPG data downloaded from the EPG server 118 to determine when the television program is scheduled to be broadcast. In another embodiment, the set-top box device 102 can inspect a digital rights management (DRM) parameter associated with the video content to determine when the television program is scheduled to be broadcast.

If the request is not substantially concurrent with or after a time at which the television program is scheduled to be broadcast, the set-top box device 102 is adapted to return an error message indicating that the television program has not yet started or is otherwise unavailable. Conversely, if the request is substantially concurrent with or after the time at which the television program is scheduled to be broadcast, the set-top box device 102 is adapted to determine, before requesting the video content from the video server 116 via the access network 108, whether video content associated with the television program is stored locally, such as at the DVR 104 or at a memory at the set-top box device 102.

After the set-top box device 102 determines that the video content is not stored locally, the set-top box device 102 is adapted to request and receive the video content from the video server 116 via the access network 108, and to send the video content to the television 106 or the portable media player 120. On the other hand, if the set-top box device 102 determines that the video content is stored locally, the set-top box device 102 is adapted to get the video content from the DVR 104 or memory at the set-top box device 102 and to send the video content to the television 106 or the portable media player 120. In another embodiment, the set-top box device 102 can instruct the DVR 104 to send the video content to the television 106, for example, where the DVR 104 is separately coupled to the television 106.

Figure 2:
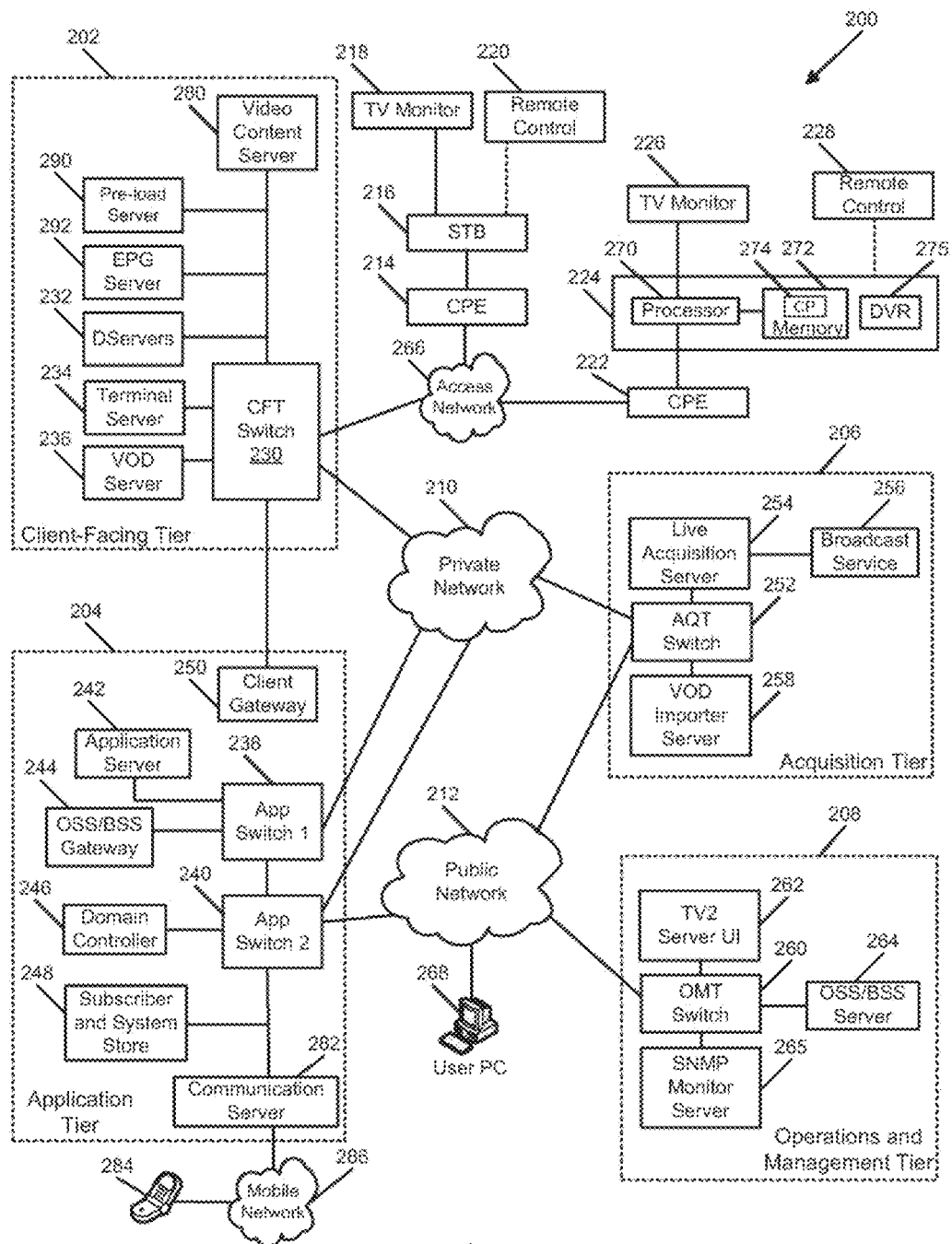
FIG. 2 is a block diagram illustrating another particular embodiment of a system to deliver video content.

FIG. 2 shows a second particular embodiment of a system 200 to deliver video content. The system 200 includes elements of an IPTV system having a client facing tier 202, an application tier 204, an acquisition tier 206, and an operations and management tier 208. Each tier 202, 204, 206, and 208 is coupled to a private network 210, a public network 212, or both the private network 210 and the public network 212. For example, the client-facing tier 202 can be coupled to the private network 210, while the application tier 204 can be coupled to the private network 210 and to a public network, such as the Internet. The acquisition tier 206 can also be coupled to the private network 210 and to the public network 212. Moreover, the operations and management tier 208 can be coupled to the public network 212.

The various tiers 202, 204, 206 and 208 communicate with each other via the private network 210 and the public network 212. For instance, the client-facing tier 202 can communicate with the application tier 204 and the acquisition tier 206 via the private network 210. The application tier 204 can also communicate with the acquisition tier 206 via the private network 210. Further, the application tier 204 can communicate with the acquisition tier 206 and the operations and management tier 208 via the public network 212. Moreover, the acquisition tier 206 can communicate with the operations and management tier 208 via the public network 212. In a particular embodiment, elements of the application tier 204 can communicate directly with the client-facing tier 202.

The client-facing tier 202 can communicate with user equipment via a private access network 266, such as an IPTV access network. In an illustrative embodiment, customer premises equipment (CPE) such as a first CPE device 214 and a second CPE device 222 can be coupled to the private access network 266. The CPE devices 214 and 222 can include modems (e.g., digital subscriber line modems), residential gateways, routers, other devices, or any combination thereof. The client-facing tier 202 can communicate with a first representative set-top box (STB) device 216 via the first CPE device 214 and with a second representative set-top box device 224 via the second CPE device 222. The client-facing tier 202 can communicate with a large number of set-top boxes over a wide geographic area, such as a regional area, a metropolitan area, a viewing area, or any other suitable geographic area that can be supported by networking the client-facing tier 202 to numerous set-top box devices. In one embodiment, the client-facing tier 202 can be coupled to the CPE devices 214 and 222 via fiber optic cables. Alternatively, the CPE devices 214 and 222 can be digital subscriber line (DSL) modems that are coupled to one or more network nodes via twisted pairs, and the client-facing tier 202 can be coupled to the network nodes via fiber-optic cables. Each of the set-top box devices 216 and 224 can process data received from the private access network 266 via an IPTV software platform such as Microsoft®. TV IPTV Edition.

The first set-top box device 216 can be coupled to a first display device 218, such as a first television monitor, and the second set-top box device 224 can be coupled to a second display device 226, such as a second television monitor. Moreover, the first set-top box device 216 can communicate with a first remote control 220, and the second set-top box device 224 can communicate with a second remote control 228. In an exemplary, non-limiting embodiment, each of the set-top box devices 216 and 224 can receive data or video from the client-facing tier 202 via the private access network 266 and render or display the data or video at the display device 218 or 226 to which it is coupled. The set-top box devices 216 and 224 may include tuners that receive and decode television programming information for transmission to the display devices 218 and 226. Further, each of the set-top box devices 216 and 224 can include processing logic and memory accessible to the processing logic, such as the STB processor 270 and the STB memory device 272. Each STB memory device may include one or more computer programs, such as the computer program 274, that are executable by the STB processing logic. In one embodiment, one or more of the set-top box devices 216 and 224 may include integrated digital video recorder (DVR) devices or components, such as the DVR 275. In other embodiments, one or more of the set-top box devices 216 and 224 can be coupled to external DVR devices.

In an illustrative embodiment, the client-facing tier 202 can include a client-facing tier (CFT) switch 230 that manages communication between the client-facing tier 202 and the private access network 266, and between the client-facing tier 202 and the private network 210. As shown, the CFT switch 230 is coupled to one or more distribution servers (D-servers) 232 that may receive and store video content, requests for video content, other data, or any combination thereof, which is bound to and from the set-top box devices 216 and 224. The CFT switch 230 can also be coupled to a terminal server 234 that provides terminal devices with a common connection point to the private network 210. In a particular embodiment, the CFT switch 230 can also be coupled to a video-on-demand (VOD) server 236. The CFT switch 230 is also coupled to a video content server 280 that stores video content that is to be distributed via the access network 266 to the set-top box devices 216 and 224. In an illustrative, non-limiting embodiment, the CFT switch 230 can be coupled to a plurality of video content servers, each of which is associated with one or more channels. Further, the CFT switch 230 can be coupled to one or more pre-load servers 290.

The application tier 204 communicates with both the private network 210 and the public network 212. The application tier 204 can include a first application tier (APP) switch 238 and a second APP switch 240. The first APP switch 238 can be coupled to the second APP switch 240. The first APP switch 238 can be coupled to an application server 242 and to an OSS/BSS gateway 244. The application server 242 provides applications to the set-top box devices 216 and 224 via the private access network 266. Such applications enable the set-top box devices 216 and 224 to provide functions such as display, messaging, processing of IPTV data and VOD material, gaming functions, other functions, or any combination thereof. In a particular embodiment, the OSS/BSS gateway 244 includes operation systems and support (OSS) data, as well as billing systems and support (BSS) data.

The second APP switch 240 is coupled to a domain controller 246 that is adapted to provide web access, for example, to subscribers via the public network 212. The second APP switch 240 can be coupled to a subscriber and system store 248 that includes account information, such as account information that is associated with users who access the system 200 via the private network 210 or the public network 212. In a particular embodiment, the application tier 204 can also include a client gateway 250 that communicates data directly to the client-facing tier 202. In this embodiment, the client gateway 250 can be coupled directly to the CFT switch 230. The client gateway 250 can provide user access to the private network 210 and the tiers coupled thereto. Further, the second APP switch 240 is coupled to a communication server 282 that communicates with mobile devices, such as the cellular phone 284, via one or more mobile communication networks 286.

In a particular embodiment, the set-top box devices 216 and 224 can access the system via the private access network 266 using information received from the client gateway 250. The private access network 266 provides security for the private network 210. User devices can access the client gateway 250 via the private access network 266, and the client gateway 250 can allow such devices to access the private network 210 once the devices are authenticated or verified. Similarly, the client gateway 250 can prevent unauthorized devices, such as hacker computers or stolen set-top box devices, from accessing the private network 210 by denying access to these devices beyond the private access network 266.

For example, when the set-top box device 216 accesses the system 200 via the private access network 266, the client gateway 250 can verify subscriber information by communicating with the subscriber and system store 248 via the private network 210, the first APP switch 238 and the second APP switch 240. Further, the client gateway 250 can verify billing information and status by communicating with the OSS/BSS gateway 244 via the private network 210 and the first APP switch 238. The OSS/BSS gateway 244 can transmit a query across the first APP switch 238, to the second APP switch 240, and the second APP switch 240 can communicate the query across the public network 212 to the OSS/BSS server 264. After the client gateway 250 confirms subscriber and/or billing information, the client gateway 250 can allow the set-top box device 216 access to IPTV content and VOD content. If the client gateway 250 cannot verify subscriber information for the set-top box device 216, (e.g., it is connected to a different twisted pair), the client gateway 250 can deny transmissions to and from the set-top box device 216 beyond the private access network 266.

The acquisition tier 206 includes an acquisition tier (AQT) switch 252 that communicates with the private network 210. The AQT switch 252 can also communicate with the operations and management tier 208 via the public network 212. In a particular embodiment, the AQT switch 252 can be coupled to a live acquisition server 254 that receives television content, for example, from a broadcast service 256. Further, the AQT switch can be coupled to a video-on-demand importer server 258 that stores television content received at the acquisition tier 206 and communicates the stored content to the client-facing tier 202 via the private network 210.

The operations and management tier 208 can include an operations and management tier (OMT) switch 260 that conducts communication between the operations and management tier 208 and the public network 212. In the illustrated embodiment, the OMT switch 260 is coupled to a TV2 server 262 that is adapted to provide a TV2 user interface to user computers 268 via the public network 212, for example. Additionally, the OMT switch 260 can be coupled to an OSS/BSS server 264 and to a simple network management protocol (SNMP) monitor 265 that monitors network devices. In a particular embodiment, the OMT switch 260 can communicate with the AQT switch 252 via the public network 212.

In an illustrative embodiment, the pre-load server 290 is adapted to identify a television program that is scheduled to be broadcast at a time that is during a peak viewing period. In one example, the pre-load server 290 can be adapted to obtain data related to television programs from the EPG server 292, or from another source at the IPTV system 200, and to identify the television program based on the data obtained from the EPG server 292 or other source.

In addition, the pre-load server 290 is adapted to identify a recipient multimedia storage device that is to receive video content associated with the identified television program, such as the set-top box device 224 (which includes the DVR 275), the phone 284, or a combination thereof. In one embodiment, the pre-load server 290 can be adapted to determine that the recipient multimedia storage device is scheduled to record the television program. For example, the pre-load server 290 can be adapted to store data received from the set-top box device 224 indicating that the set-top box device 224 has received a command to record the television program via the DVR 275.

In another embodiment, the pre-load server 290 can be adapted to intelligently identify the recipient multimedia storage device by identifying a corresponding multimedia receiver, such as the set-top box device 224 or the phone 284, which is likely to request the television program. In one example, the pre-load server 290 can be adapted to request from the OSS/BSS server 264, the subscriber and system store 248, the communication server 282, another historical data server, or any combination thereof, data indicating multimedia receivers that received previous episodes associated with the television program, data indicating multimedia receivers that previously received a related television program, data indicating multimedia receivers that previously received a television program having a same actor, other data suitable to predict whether a multimedia receiver is likely to request video content associated with the television program, or any combination thereof.

The pre-load server 290 is adapted to instruct the video content server 280 to send video content associated with the identified television program to the recipient multimedia storage device during a non-peak period that precedes the peak viewing period during which the television program is scheduled to be broadcast. The video content includes data to prevent viewing of the video content prior to the time at which the television program is scheduled to be broadcast.

In one embodiment, the pre-load server 290 is adapted to generate the data. In another embodiment, the pre-load server 290 can be adapted to obtain the data to prevent viewing of the video content prior to the time at which the television program is scheduled to be broadcast from another source. In still another embodiment, the data can be included with video content sent by a video content provider (such as the broadcast service 256) or an acquisition source (such as the live acquisition server 254) to the video server 280.

In a particular embodiment, the set-top box device 224 can be adapted to determine whether a television program is scheduled to be broadcast at a time that is during a peak viewing period, in response to receiving a command to record the program via the DVR 275. If so, the set-top box device 224 can send data to the pre-load server 290 indicating that the set-top box device 224 is scheduled to record the television program. The set-top box device 224 is adapted to store the DVR 275 video content associated with the television program, which is received from the video server 280 during a non-peak period that precedes the peak viewing period.

In addition, the set-top box device 224 is adapted to receive a request from a user to view a television program. The set-top box device 224 is adapted to determine whether the request is substantially concurrent with or after a time at which the television program is scheduled to be broadcast. If the request is not substantially concurrent with or after a time at which the television program is scheduled to be broadcast, the set-top box device 224 is adapted to return an error message indicating that the television program has not yet started or is otherwise unavailable. Conversely, if the request is substantially concurrent with or after the time at which the television program is scheduled to be broadcast, the set-top box device 224 is adapted to determine, before requesting the video content from the video server 280 via the access network 266, whether video content associated with the television program is stored locally, such as at the set-top box device 224 via the DVR 275.

After the set-top box device 224 determines that the video content is not stored locally, the set-top box device 224 is adapted to request and receive the video content from the video content server 280 or a D-server 232 via the access network 266, and to send the video content to the television monitor 226. On the other hand, if the set-top box device 224 determines that the video content is stored locally, the set-top box device 224 is adapted to retrieve the video content from the DVR 275 and to send the video content to the television monitor 226.

Figure 3:
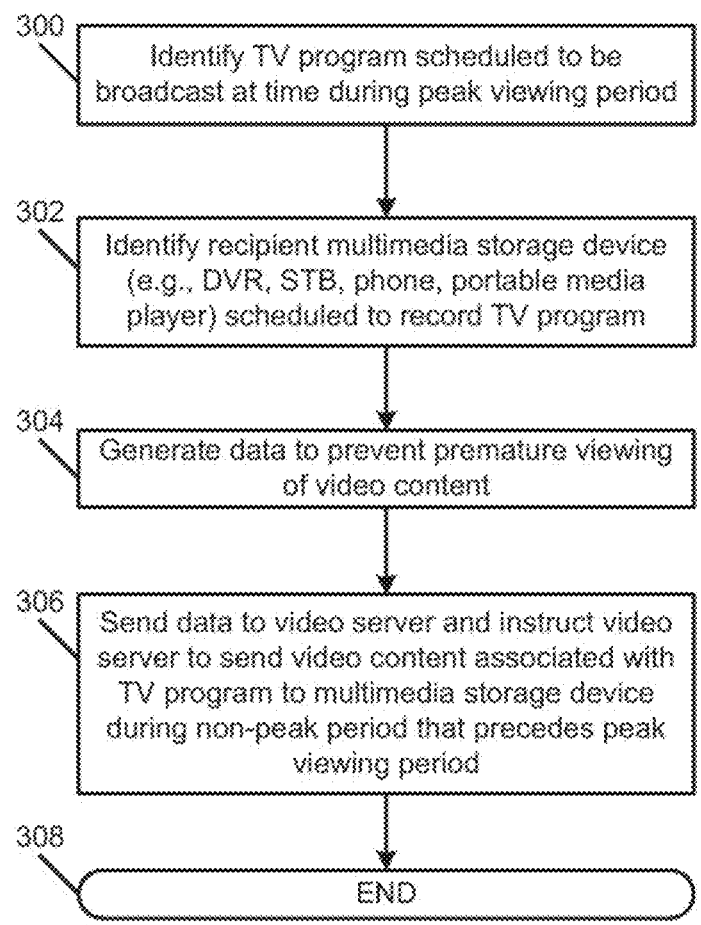
FIG. 3 is a flow diagram illustrating a particular embodiment of a method of delivering video content.

FIG. 3 illustrates a particular embodiment of a method of delivering video content. At block 300, a pre-load server identifies a television program that is scheduled to be broadcast at a time that is during a peak viewing period. Moving to block 302, the pre-load server identifies a recipient multimedia storage device, such as a set-top box device, a DVR, a mobile phone, a portable media player (for example, handheld computing device, portable MPEG player, other portable video content player, or any combination thereof), or any combination thereof, that is scheduled to record the television program. In one example, the pre-load server can receive data from the multimedia storage device indicating that the multimedia storage device has received a command to record the television program. In another example, the pre-load server can request data indicating multimedia storage devices scheduled to record the television program from another source.

Proceeding to block 304, in a particular embodiment, the pre-load server generates data to prevent viewing of video content related to the television program. For instance, the pre-load server can generate digital rights management (DRM) data that includes data indicating the time at which the television program is scheduled to be broadcast. In another embodiment, the pre-load server can add data indicating the time to pre-existing DRM data associated with the television program.

Continuing to block 306, the pre-load server sends the data to prevent premature viewing of video content associated with the television program to a video server. The pre-load server also instructs the video server to send the video content associated with the television program to the recipient multimedia storage device during a non-peak period that precedes the peak viewing period during which the television program is scheduled to be broadcast. The method terminates at 308.

Figure 4:
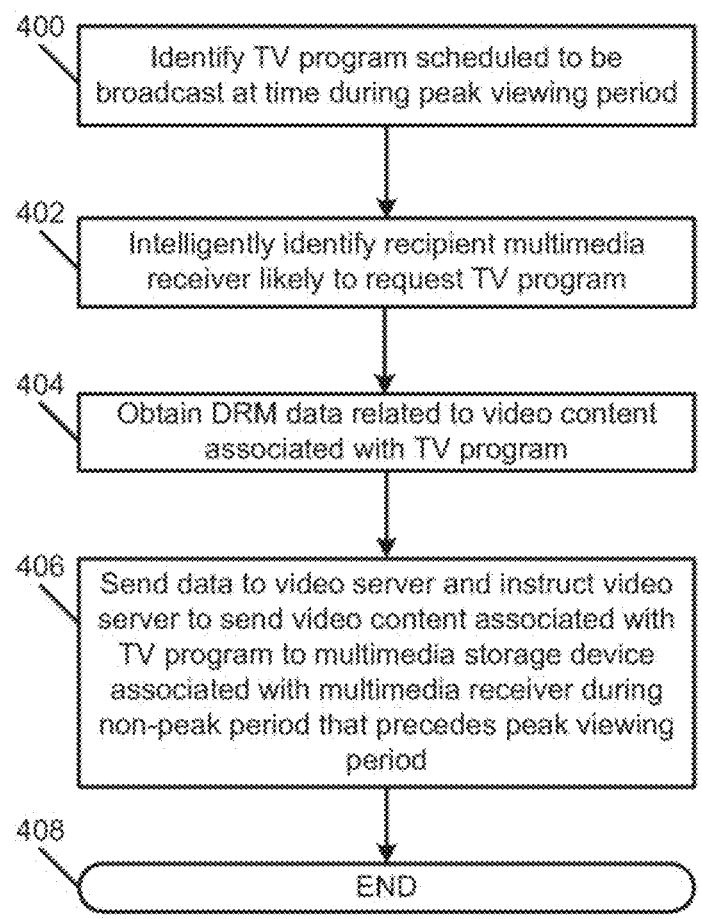
FIG. 4 is a flow diagram illustrating another particular embodiment of a method of delivering video content.

FIG. 4 illustrates another particular embodiment of a method of delivering video content. At block 400, a pre-load server identifies a television program that is scheduled to be broadcast at a time that is during a peak viewing period. Moving to block 402, the pre-load server intelligently identifies a recipient multimedia receiver, such as a set-top box device, that is likely to request the television program. In one example, the pre-load server can request from a historical data server data indicating multimedia receivers that received previous episodes associated with the television program, data indicating multimedia receivers that previously received a related television program, data indicating multimedia receivers that previously received a television program having a same actor, other data suitable to predict whether a multimedia receiver is likely to request video content associated with the television program, or any combination thereof.

Proceeding to block 404, in a particular embodiment, the pre-load server obtains data to prevent viewing of video content related to the television program. For instance, the pre-load server can obtain digital rights management (DRM) data that includes data indicating the time at which the television program is scheduled to be broadcast. Continuing to block 406, the pre-load server sends the data to prevent premature viewing of video content associated with the television program to a video server. The pre-load server also instructs the video server to send the video content associated with the television program to a multimedia storage device associated with the multimedia receiver (such as a DVR integrated with or coupled to a set-top box device) during a non-peak period that precedes the peak viewing period during which the television program is scheduled to be broadcast. The method terminates at 408.

Figure 5:
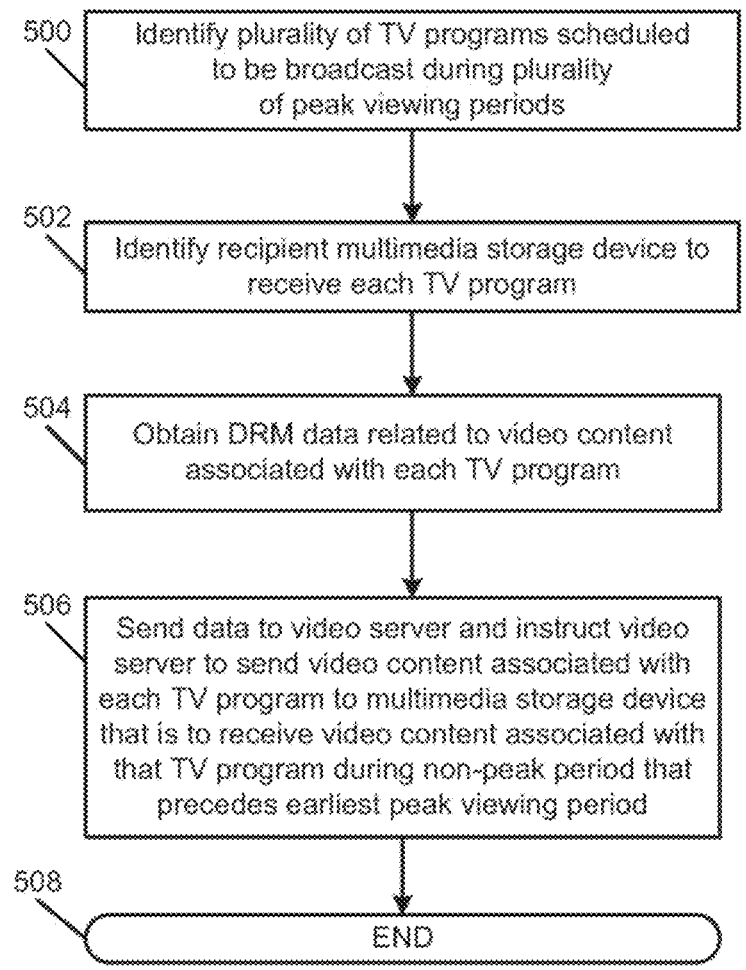
FIG. 5 is a flow diagram illustrating a further embodiment of a method of delivering video content.

FIG. 5 illustrates a further embodiment of a method of delivering video content. At block 500, a pre-load server identifies a plurality of television programs, where each television program is scheduled to be broadcast at a time that is during one of a plurality of peak viewing periods. For example, the pre-load server can request data from a video acquisition server at the beginning of a calendar week (or another period, such as a day or month) indicating television programs that are scheduled to be broadcast during peak viewing periods, such as television programs that are scheduled to be broadcast during daily prime time hours and television programs that are likely to cause peak viewership (such as premieres, finales, television programs scheduled to be broadcast opposite major sporting events or other live events).

Moving to block 502, the pre-load server identifies a recipient multimedia storage device that is to receive each of the plurality of identified television programs. The pre-load server can identify, for example, a plurality of DVRs, other multimedia storage devices, or any combination thereof, where each such device is scheduled to record an identified television program. Additionally, the pre-load server can intelligently identify a plurality of DVRs, other multimedia storage devices, or any combination thereof, where each such device is associated with a multimedia receiver that is likely to request an identified television program.

Proceeding to block 504, in a particular embodiment, the pre-load server obtains data to prevent viewing of video content related to each television program. For instance, the pre-load server can obtain digital rights management (DRM) data that includes data indicating the time at which each television program is scheduled to be broadcast. Continuing to block 506, the pre-load server sends the data to prevent premature viewing of video content associated with each television program to a video server. The pre-load server also instructs the video server to send video content associated with each television program to a multimedia storage device that is to receive that television program during a non-peak period that precedes the earliest peak viewing period during which any of the plurality of television programs is scheduled to be broadcast. Thus, in an example embodiment, video content for all of the plurality of television programs can be pre-loaded at corresponding multimedia storage devices at the beginning of the calendar week or other period, before the first peak viewing period (such as Sunday prime time) occurs. The method terminates at 508.

Figure 6:
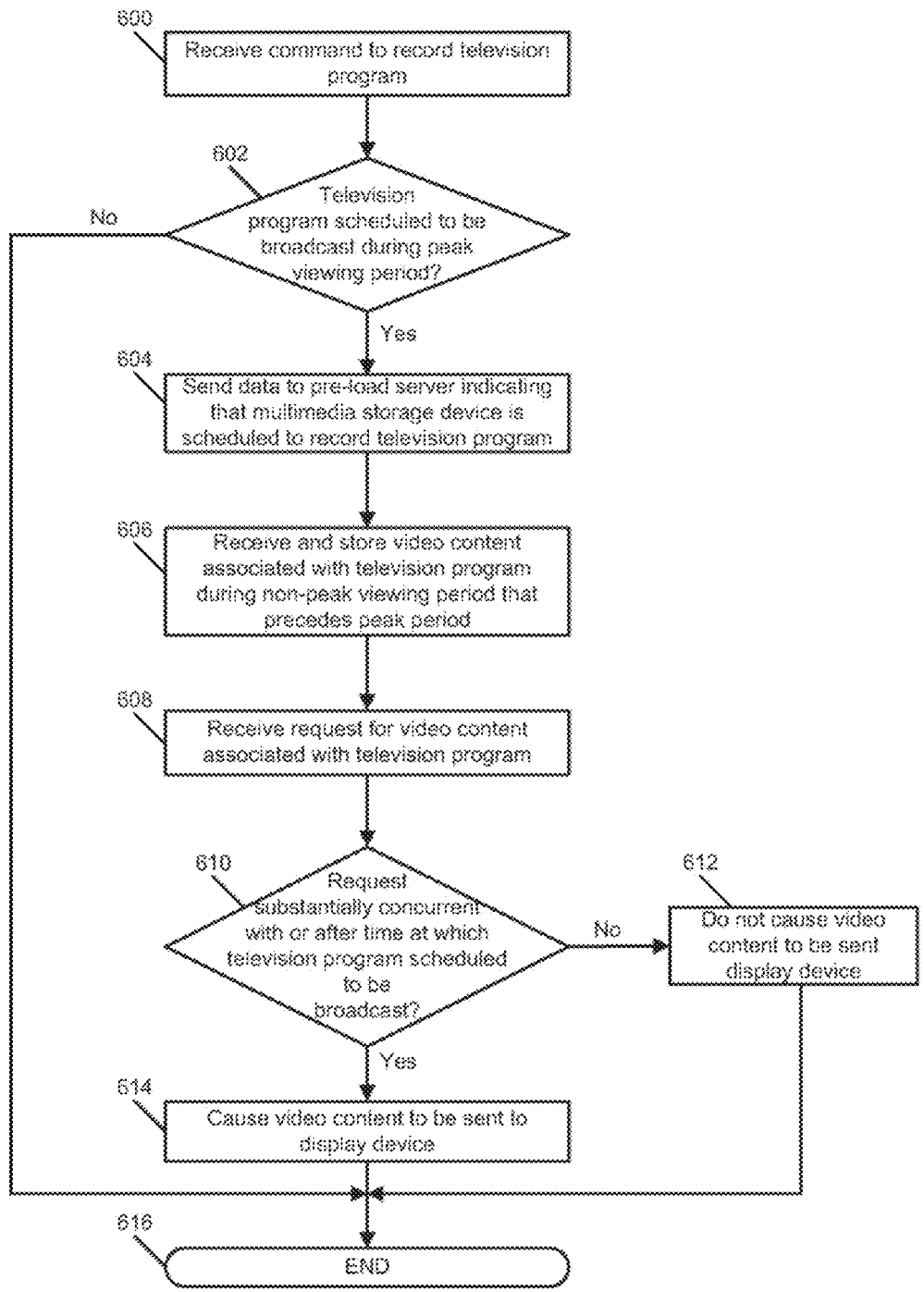
FIG. 6 is a flow diagram illustrating a particular embodiment of a method of receiving video content.

FIG. 6 illustrates a particular method of receiving video content. At block 600, a multimedia storage device, such as a DVR or other multimedia storage device, receives a command to record a television program. Moving to decision node 602, the multimedia storage device determines whether the television program is scheduled to be broadcast during a peak viewing period. If so, the method proceeds to block 604, and the multimedia storage device sends data to a pre-load server indicating that the multimedia storage device is scheduled to record the television program. Proceeding to block 606, the multimedia storage device receives and stores video content associated with the television program during a non-peak period that precedes the peak viewing period.

Continuing to block 608, the multimedia storage device receives a request for the video content associated with the television program. The request can be received from a set-top box device, from a user, from a display device, or any combination thereof. Advancing to decision node 610, the multimedia storage device determines, based on data received with the video content, whether the request is substantially concurrent with or after a time at which the television program is scheduled to be broadcast. If not, the method moves to block 612, and the multimedia storage device does not cause the video content to be sent to a display device. Whereas, if the request is substantially concurrent with or after a time at which the television program is scheduled to be broadcast, the method moves to block 614, and the multimedia storage device causes the video content to be sent to a display device, directly or via another device, such as a set-top box device or other multimedia receiver. The method terminates at 616.

Figure 7:
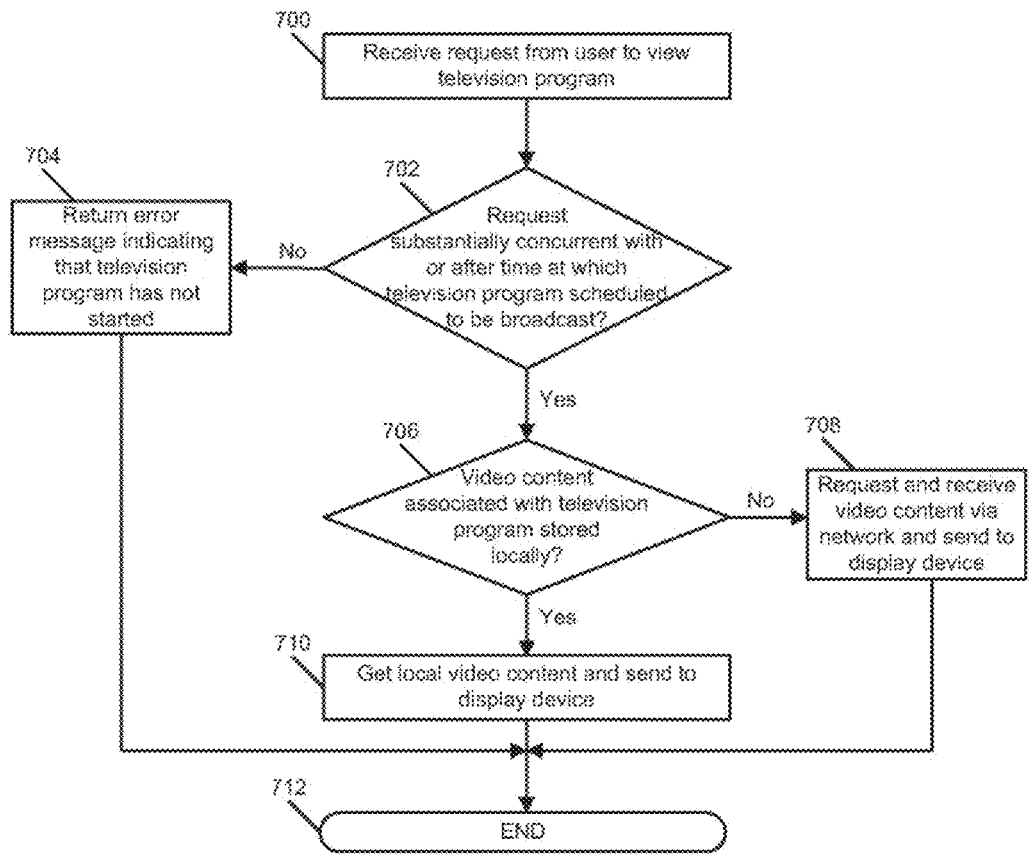
FIG. 7 is a flow diagram illustrating another particular embodiment of a method of receiving video content.

FIG. 7 illustrates another particular embodiment of a method of receiving video content. At block 700, a multimedia receiver receives a request from a user to view a television program. Moving to decision node 702, the multimedia receiver determines whether the request is substantially concurrent with or after a time at which the television program is scheduled to be broadcast. If not, the method proceeds to block 704, and the multimedia receiver returns an error message indicating that the television program has not yet started. Conversely, if the multimedia receiver determines that the request is substantially concurrent with or after a time at which the television program is scheduled to be broadcast, the method proceeds to decision node 706, and the multimedia receiver determines whether video content associated with the television program is stored locally, such as at a DVR that is coupled to or integrated with the multimedia receiver. After the multimedia receiver determines that the video content is not stored locally, the method continues to block 708, and the multimedia receiver requests and receives the video content from a video content source via a network, such as an IPTV access network, and sends the video content to a display device coupled to the multimedia receiver. On the other hand, if the multimedia receiver determines that the video content is stored locally, the multimedia receiver gets the video content from a local multimedia storage device and sends the video content to the display device. In another embodiment, the multimedia receiver can instruct the multimedia storage device to send the video content to the display device. The method terminates at 712.

Figure 8:
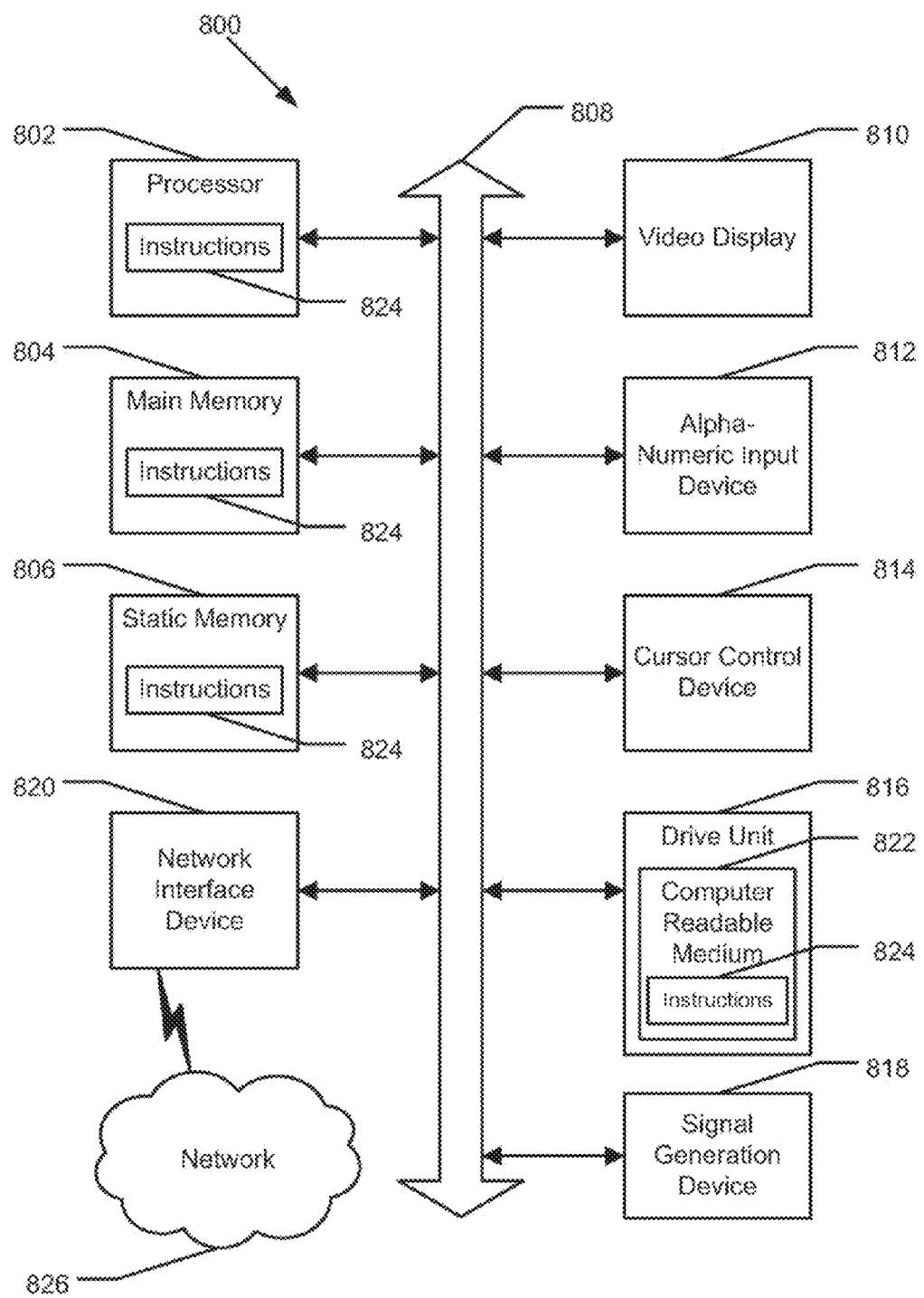
FIG. 8 is a block diagram illustrating a particular embodiment of a general computer system.

FIG. 8 shows an illustrative embodiment of a general computer 800 including a set of instructions that can be executed to cause the computer system to perform any one or more of the methods or computer based functions disclosed herein. The computer system 800 may operate as a standalone device or may be connected, e.g., using a network, to other computer systems or peripheral devices. In an illustrative embodiment, such standalone and peripheral devices can include, for example, multimedia receivers, multimedia storage devices, mobile phones, portable media players, servers, other network elements, or any combination thereof, as illustrated in FIGS. 1-2.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802, e.g., a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. The computer system 800 can also include a disk drive unit 816, a signal generation device 818, such as a speaker or remote control, and a network interface device 820.

In a particular embodiment as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media. The network interface device 820 can provide connectivity to a network 826, e.g., a wide area network (WAN), a local area network (LAN), or other network.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

In accordance with the embodiments disclosed herein, a system and method to deliver video content are provided that pre-load video content associated with a television program scheduled to be broadcast during a peak viewing period onto an identified DVR or other device, during a non-peak period prior to the peak viewing period. The video content includes data to prevent premature viewing of the video content. In a particular embodiment, the disclosed embodiments relieve network stress in a video distribution network, such as an IPTV network, by pushing highly anticipated content to viewers in advance, during off-peak periods.

For example, if a large number of viewers attempt to simultaneously watch a season premiere of "24," for example, network congestion would typically result. In particular, bandwidth for a last mile very high-speed digital subscriber line (VDSL) link (e.g., between the DSLAM and the household or residential gateway) will be reduced. The disclosed embodiments provide relief for such network congestion by loading video content for 24, for example, to targeted DVRs and other devices in advance, during off-peak network periods. Targeted devices can include, for instance, DVRs or other devices scheduled to record 24, DVRs or other devices that have previously received video content associated with 24 or a related television program, and the like. Advance loading of video content reduces the number of devices to which video content for 24 must be streamed during the scheduled broadcast, thereby utilizing less total bandwidth for the video distribution network. This can not only improve delivery of video content to households during the broadcast but can also free up bandwidth for other customers to use the Internet and other network services.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGS. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method, comprising:
   identifying, by a server comprising a processor, video content corresponding to a program having a scheduled broadcast time that occurs during a first viewing period, wherein the first viewing period satisfies a viewership threshold; and
   facilitating, by the server, a transfer of the video content to a multimedia storage device during a second viewing period prior to the first viewing period, wherein the video content comprises data to prevent the multimedia storage device from sending the video content to another device prior to a time when the program is scheduled to be broadcast, wherein the multimedia storage device, based on the data, provides a denial of access indicator responsive to a request for the video content occurring prior to the time when the program is scheduled to be broadcast.

2. The method of claim 1, further comprising receiving, by the server, an indication from the multimedia storage device that the multimedia storage device has received an instruction to record the program, wherein the program is a television program.

3. The method of claim 1, further comprising, generating, by the server, the data to prevent the multimedia storage device from sending the video content to another device prior to the time when the program is scheduled to be broadcast.

4. The method of claim 3, wherein the data comprises digital rights management data.

5. The method of claim 1, further comprising identifying, by the server, the multimedia storage device, wherein the identifying of the video content, the identifying of the multimedia storage device or both is based on a request to record the video content.

6. The method of claim 1, wherein the multimedia storage device comprises one of a set-top box device, a digital video recorder, a portable media player, a mobile phone, or a combination thereof.

7. The method of claim 1, wherein the data prevents the multimedia storage device from sending the video content to a display device.

8. The method of claim 1, wherein the facilitating of the transfer of the video content further comprises:
   sending, by the server, the video content to a video server; and
   instructing, by the server, the video server to send the video content to the multimedia storage device during the second viewing period.

9. A machine readable storage device, comprising executable instructions that, when executed by a processing system including a processor, facilitate performance of operations, comprising:
   identifying video content corresponding to program scheduled for a later broadcast time during a first viewing period that satisfies a viewership threshold; and
   facilitating a transfer of the video content associated with the program to a multimedia storage device during a second viewing period, prior to the first viewing period to obtain a recorded program,
   wherein the facilitating of the transfer of the video content comprises facilitating a transfer of data to prevent a viewing of the recorded program prior to a time when the program is scheduled to be broadcast,
   wherein the multimedia storage device, based on the data to prevent viewing, provides a denial of access indicator responsive to a request for the video content occurring prior to the time when the program is scheduled to be broadcast.

10. The machine readable storage device of claim 9, wherein the identifying of the video content is based on a request received from a requesting device, and wherein the requesting device comprises one of a set-top box device, a display device, a digital video recorder, a portable media player, a mobile phone, or a combination thereof.

11. The machine readable storage device of claim 10, wherein the data prevents viewing of the recorded program via the requesting device.

12. The machine readable storage device of claim 9, further comprising determining, based on data received with the video content, whether the request precedes the later broadcast time.

13. The machine readable storage device of claim 9, wherein the data prevents viewing of the recorded program at a display device, and wherein the video content associated with the recorded program is sent to the display device via a set-top box, and wherein the data prevents the multimedia storage device from sending the video content to the display device.

14. A server, comprising:
    a processing system including a processor; and
    a memory that stores executable instructions that, when executed by the processing system, facilitate performance of operations, comprising:

identifying video content having a scheduled broadcast time that occurs during a first viewing period that satisfies a viewership threshold; and facilitating a transfer of the video content to a multimedia storage device during a second viewing period that precedes the first viewing period, wherein the video content is stored by the multimedia storage device as recorded video content, wherein the facilitating of the transfer of the video content includes facilitating a transfer of data to prevent viewing of the recorded video content prior to the scheduled broadcast time, wherein the multimedia storage device, based on the data to prevent viewing, provides a denial of access indicator responsive to a request for the video content occurring prior to the time when the video content is scheduled to be broadcast.

15. The server of claim 14, wherein the transfer of the video content is provided by way of a video server, the operations further comprising instructing the video server to send the video content to the multimedia storage device during the second viewing period.

16. The server of claim 14, wherein the operations further comprise generating the data to prevent viewing of the video content prior to the time when the video content is scheduled to be broadcast.

17. The server of claim 16, wherein the data comprises digital rights management data.

18. The server of claim 14, wherein the multimedia storage device comprises one of a set-top box device, a digital video recorder, a portable media player, a mobile phone, or a combination thereof.

19. The server of claim 14, wherein the operations further comprise identifying the multimedia storage device based on historical data associated with one of the multimedia storage device, a customer related to the multimedia storage device, a multimedia receiver related to the multimedia storage device, or a combination thereof.

20. The server of claim 19, wherein the historical data indicates that video content associated with a related television program was sent to one of the multimedia storage device, a multimedia receiver associated with the multimedia storage device, or a combination thereof.

* * * * *